(12) United States Patent
Davenport et al.

(10) Patent No.: US 7,702,561 B2
(45) Date of Patent: Apr. 20, 2010

(54) AUTOMATIC METHOD FOR GENERATING A MATHEMATICAL PROGRAM TO IDENTIFY AN OPTIMAL ALL-OR-NOTHING BID SET FOR PROCUREMENT-RELATED REVERSE AUCTIONS

(75) Inventors: Andrew J. Davenport, Ossining, NY (US); Jayant R. Kalagnanam, Tarrytown, NY (US); Ho Soo Lee, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 1869 days.

(21) Appl. No.: 09/917,818

(22) Filed: Jul. 31, 2001

(65) Prior Publication Data

US 2003/0033236 A1 Feb. 13, 2003

(51) Int. Cl.
*G06Q 40/00* (2006.01)
(52) U.S. Cl. .................. 705/37; 705/7; 705/8; 705/28; 705/36 R
(58) Field of Classification Search ............. 705/37, 705/8, 7, 36, 28
See application file for complete search history.

(56) References Cited

U.S. PATENT DOCUMENTS

| | | | |
|---|---|---|---|
| 5,974,403 A * | 10/1999 | Takriti | 705/412 |
| 6,094,645 A * | 7/2000 | Aggarwal et al. | 706/47 |
| 6,230,146 B1 * | 5/2001 | Alaia et al. | 705/37 |
| 6,272,473 B1 * | 8/2001 | Sandholm | 705/37 |
| 6,321,132 B1 * | 11/2001 | Dwande et al. | 700/97 |
| 6,374,227 B1 * | 4/2002 | Ye | 705/8 |
| 6,415,270 B1 * | 7/2002 | Rackson et al. | 705/37 |

OTHER PUBLICATIONS

Nisan, N., Bidding and Allocation in Combinatorial Auctions (Apr. 2000).*

* cited by examiner

*Primary Examiner*—Daniel S Felten
(74) *Attorney, Agent, or Firm*—Whitham, Curtis, Christofferson & Cook, P.C.; Stephen C. Kaufman

(57) ABSTRACT

A method is provided for identifying a cost-minimizing bid set in a reverse combinatorial auction subject to various business rules for all-or-nothing bundled bids. The method includes introducing a decision variable for each bid, introducing a counting variable to indicate whether bids from a supplier are chosen in an optimal bid set, modeling demand constraints for each item using the bid variables, modeling minimum and maximum numbers of suppliers based on the counting variables, introducing dummy variables to ensure existence of feasible solutions, for a given cost formulating an objective of choosing bids that arrive early based on an additional timestamped objective with the given cost level as a constraint, and introducing price modifications to handle the formulated objective of choosing bids that arrive early.

3 Claims, 11 Drawing Sheets

AUTOMATIC METHOD FOR GENERATING A MATHEMATICAL PROGRAM TO IDENTIFY AN OPTIMAL ALL-OR-NOTHING BID SET FOR PROCUREMENT-RELATED REVERSE AUCTIONS

BACKGROUND OF THE INVENTION

1. Field of the Invention

This invention generally relates to reverse auctions, and more particularly to a system and method for selecting a bid in a multi-bid reverse combinatorial auction.

2. Description of the Related Art

Strategic sourcing relates to the procurement of direct inputs used in the manufacture of a firm's primary outputs. These procurements are usually very large, both in quantity and dollar value. For example, the primary inputs for manufacturing computers include processors, RAM (random access memory), hard drives, monitors, etc. In the computer industry especially, it has been determined that up to 90% of a company's expenditures relate to procuring direct inputs, and therefore it is clear that in order to optimize efficiency and productivity a company's strategic sourcing initiatives must be executed with business acumen.

Practically speaking, the total quantity of direct inputs that needs to be procured is based on a forecasted demand for a planning horizon, which typically corresponds to a fiscal quarter. Since there is considerable uncertainty in the forecast, strategic decisions are usually made regarding the fraction of the forecast demand that must be procured up front. The demand fluctuation over the base level (which is obtained using a long-term contract) is procured on a weekly basis in most cases. However, short-term demand is usually much smaller and there is therefore less room for price negotiations.

A fundamental concern in making sourcing decisions is related to the reliability of suppliers, because defaulting suppliers might have considerable impact on the firm's ability to satisfy demand obligations. As a result, conventional forms of price negotiation have generally been confined to a small number of pre-certified suppliers that have established relationships with the company.

In effort to improve strategic sourcing in the business community, special price negotiation schemes that incorporate appropriate business practices have been employed. A reverse auction is an example of such a price negotiation scheme. Reverse auctions aggregate short-term (e.g., weekly) demand over direct inputs across multiple manufacturing plants in an effort to increase the total transaction size. As such, they have proven beneficial to both parties.

On the one hand, reverse auctions allow suppliers to provide all-or-nothing bids for bundles of direct inputs. As a result, suppliers may exploit cost complementarities for different commodities or locations, e.g., complementarities. This, in turn, allows suppliers to provide lower prices on commodity bundles, which inures to the benefit of the buyer. All-or-nothing bids also provide a way for buyers to procure a variety of commodities simultaneously, thereby saving time and money. Auctions of this type are known as "reverse combinatorial auctions."

A fundamental consideration that arises in the price negotiation schemes is the incorporation of business rules in the process of selecting winning bids. Conventionally, the price quotes offered in reverse combinatorial auctions are for the entire bundle and thus the entire bundle must be chosen, no part thereof. This makes the problem of identifying the cost-minimizing set a difficult optimization problem. (The "cost-minimizing set" corresponds to, for a given set of bids, a subset of bids such that the demand for all the items is satisfied and cost is minimized.)

In view of the foregoing considerations, it is apparent that there is need for an improved system and method for selecting bids in a reverse combinatorial auction, and more particularly one which selects the optimal bid when commodities are offered in bundles.

SUMMARY OF THE INVENTION

It is one object of the present invention to provide an improved system and method for solving the so-called cost-minimization problem in a reverse combinatorial auction, which method involves finding the optimal cost-minimizing bid set when commodities are offered in bundles.

It is another object of the present invention to provide a system and method as described above that can be used with any commercial LP/IP solver.

It is another object of the invention to provide a method for automatically generating an algorithm which may be implemented on a computer for solving the cost-minimization problem described above.

These and other objectives of the present invention are achieved by providing, first, an algorithm for identifying a cost-minimizing bid set in a reverse combinatorial auction subject to various business rules for all-or-nothing bundled bids, and second by providing a method for automatically generating this algorithm in a form that can be used with commercial LP/IP solvers. In accordance with the invention, a computer-implemented formulation is generated by populating a set of matrices based on the canonical form shown below:

minimize cx s.t.

$\rho_{lo} \leq Ax \leq \rho_{hi}$ $\sigma_{lo} \leq x \leq \sigma_{hi}$ (6)

In addition, since the matrix A is generally sparse we represent it in a sparse form by providing only the non-zero terms. We do this by specifying a large array of non-zeros indexed by an integer array that indexes the row number for each non-zero entry. Additionally, we specify 2 column vectors that indicate the column index for the non-zero entry. A method for generating these arrays and matrices is then automatically generated based on the formulation of the present invention.

The basic steps for populating there matrices are as follows:

1. Given the number of suppliers, N, and the bids $M_i$ for each supplier, the number of minimum ($S_{min}$) and maximum ($S_{max}$) winning suppliers.

2. Identify the number of decision variables as $$\sum_{i \in N} M_i + N.$$

3. Identify the total non-zero entries in the matrix A based an the number of items in each bid and the total number of suppliers.

4. Identify the number of rows in the matrix based on the total number of items and suppliers.

5. For each bid, introduce a column and populate the matrix A with non-zero elements with appropriate row and column indices.

6. For each bid, populate the cost vector c with the bid price.

7. Call a commercial solver with these matrices as input and invoke the solver.

8. Read the winning bids found by solver.

DESCRIPTION OF THE PREFERRED EMBODIMENTS

Reverse combinatorial auctions provide a mechanism whereby bidders (e.g., suppliers) can submit bids on combinations of items. Such auctions are used, for example, when due to complementarities or substitution effects bidders have preferences not just for particular items but also for sets (or bundles) of commodities.

The present invention is a system and method for implementing a reverse combinatorial auction. The auction is run as a procurement auction, where the buyer (e.g., a manufacturer) wishes to purchase different items of varying quantities for the cheapest overall price. The total quantity of each item is referred to as a lot and is treated as an indivisible unit of some weight. Suppliers can bid on combinations of items; however, a bid on any item has to be for the entire lot for that item. The present invention identifies the optimal solution to the so-called winner determination problem for a single-unit reverse combinatorial auction by selecting a winning set of bids such that each item is included in at least one winning bid. As a result, the total cost of procurement is minimized. This problem is a set covering problem, which is known to be NP-hard. NP-hard problems are problems that are difficult to solve and the amount of effort (in terms of the time required on a computer) increases exponentially as the size of the problem (such as number of bids) increases. For example, if the number of bids goes from 100 to 200, then the time required to solve the problem might go from 10 seconds to 100 seconds (not 20 seconds).

Figure 1:
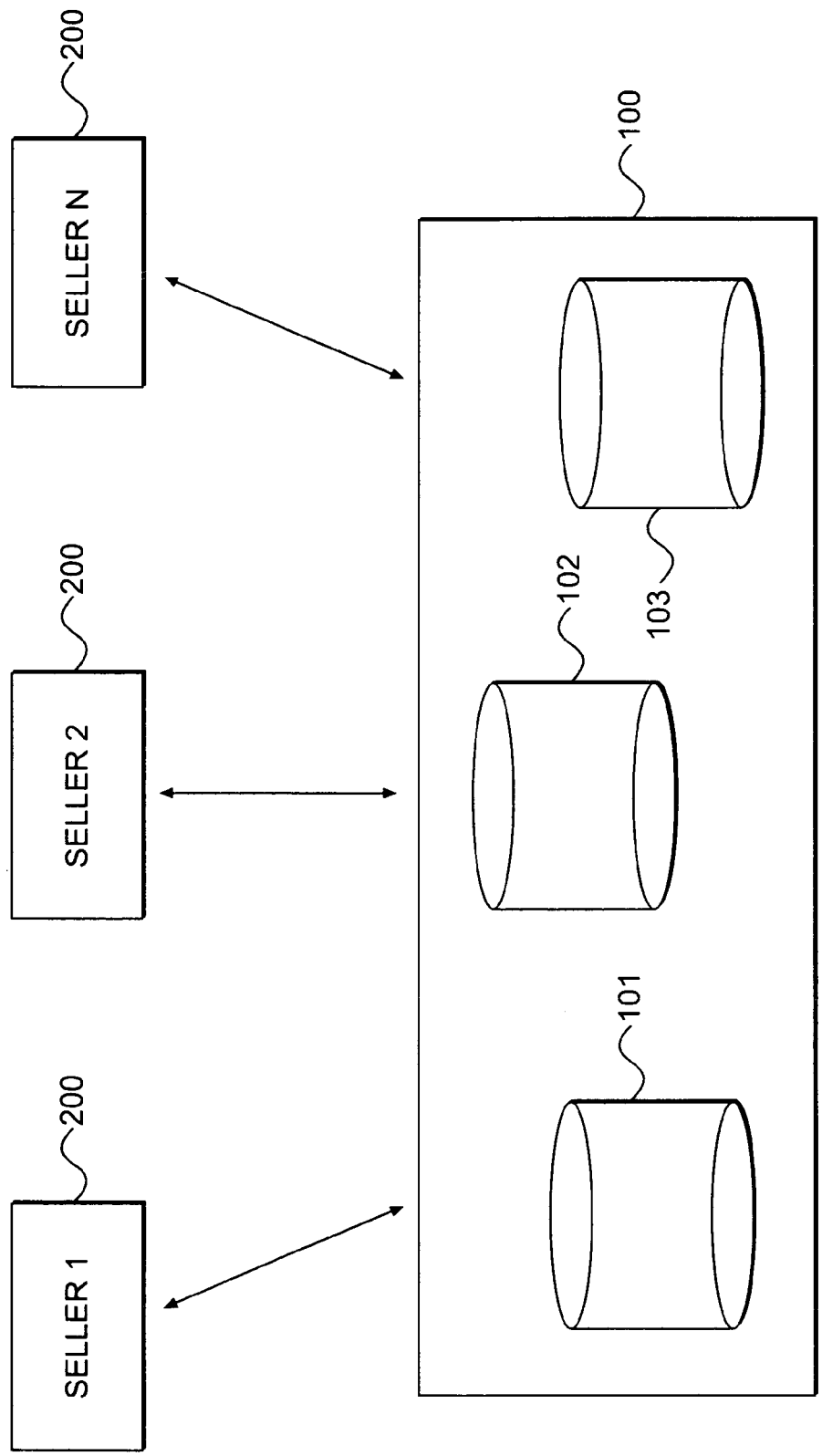
FIG. 1 provides an architecture for an auction or a request-for-quote (RFQ) system within the context of a private exchange.

FIG. 1 provides an architecture of an auction or request-for-quote (RFQ) system within a private exchange. Strategic sourcing is one context for companies to setup private exchanges for procurement. In this context, buyers setup a private marketplace on a server machine 100. The server usually uses a database to capture auctions and their associated states. For example, different auctions are captured in a table 101, the bids for each auction are held in another table 102, and the winning bids for each auction are captured in a table 103. Preferably, the sellers 200 are allowed to participate by invitation only and they interact with the server machine as clients who respond to one or more auctions.

Figure 2:
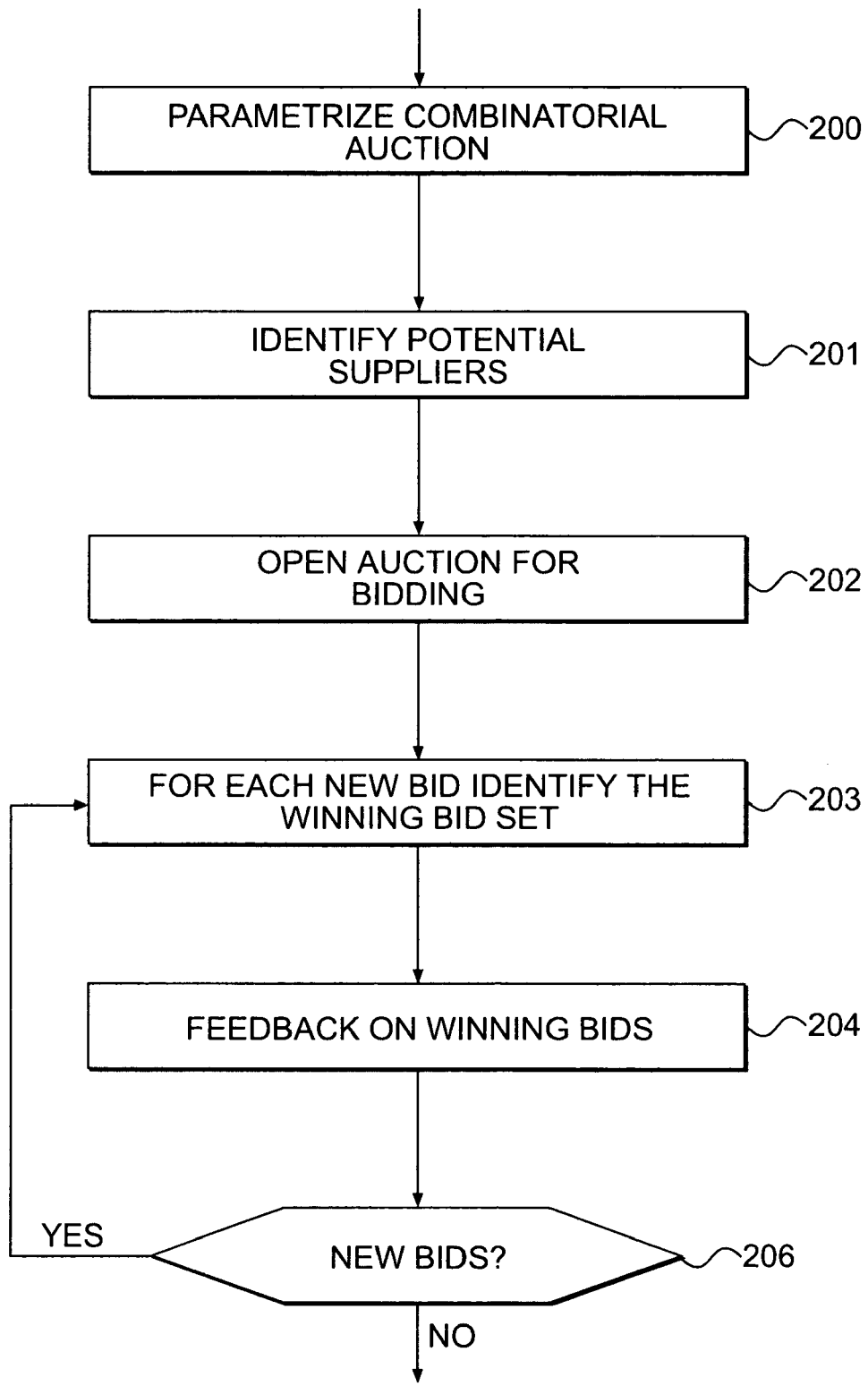
FIG. 2 provides an overview of the main functions of the method of the present invention including an information flow loop within a reverse combinatorial auction setting.

FIG. 2 provides the kernel operations and information flow required to setup single-round or multi-round auctions. The first operation 200 is parameterizing the auctions regarding single- or multiple-round, open-cry or sealed bid, reservation prices etc. Since the auction is in a private exchange, the buyers who set up an auction can choose the potential suppliers 201 who can participate in this auction and then open the auction 202 for bidding. At any given time there are a set of bids. Whenever a new bid arrives (or the auction times out), the winning bids need to be computed 203 and feedback on the winning bids 204 needs to be provided. The information provided as feedback depends on the parameterization of the auction.

Auctions that are parameterized as a single-round, sealed-bid auction only require feedback about which of the bids are winners. In multiple-round auctions, after each round the provisional winning bids and a market clearing price for each bundle (or item) is provided. If there is feedback on the winning bids, this information is fed back to block 203, where each bidder uses the information to re-formulate new bids so as to maximize their expected return for the next round of bidding. (Step 206). Typically, there is always feedback about the winning bids. In a single-round auction, the bidders do not respond with new bids but only the winning bidders will transact based on their winning bid.

Figure 3:
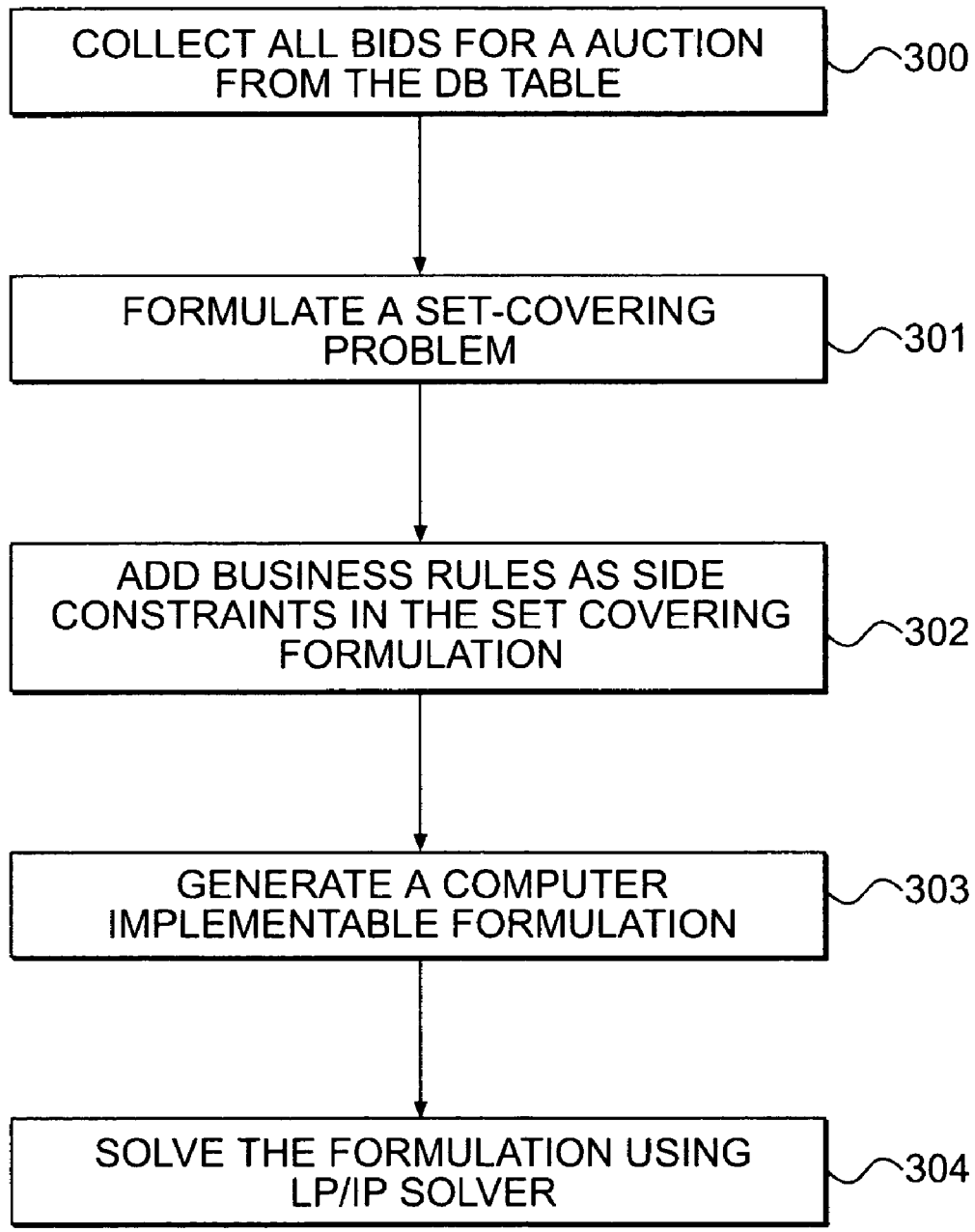
FIG. 3 provides a system level flow for solving a bid evaluation problem in accordance with the present invention.

FIG. 3 provides a system level information flow for bid evaluations. For a current auction, bids are read from a database table 300 and are used to create a set covering formulation 301 with an objective function and demand constraints. Subsequently, business rules are added to the formulation as side constraints 302. Based on this formulation, a computer-implemented representation using arrays is generated 303 in the manner explained below. This representation is then used with any commercial LP/IP solver 304 to find the cost-minimizing bid set. (Here, "LP" means linear programming and "IP" means integer programming.) Some examples of commercial LP/IP solvers are Optimization Subroutine Library (OSL from IBM), CPLEX (from ILOG, Inc.), XPRESS-MP (from Dash Associates).

Figure 4:
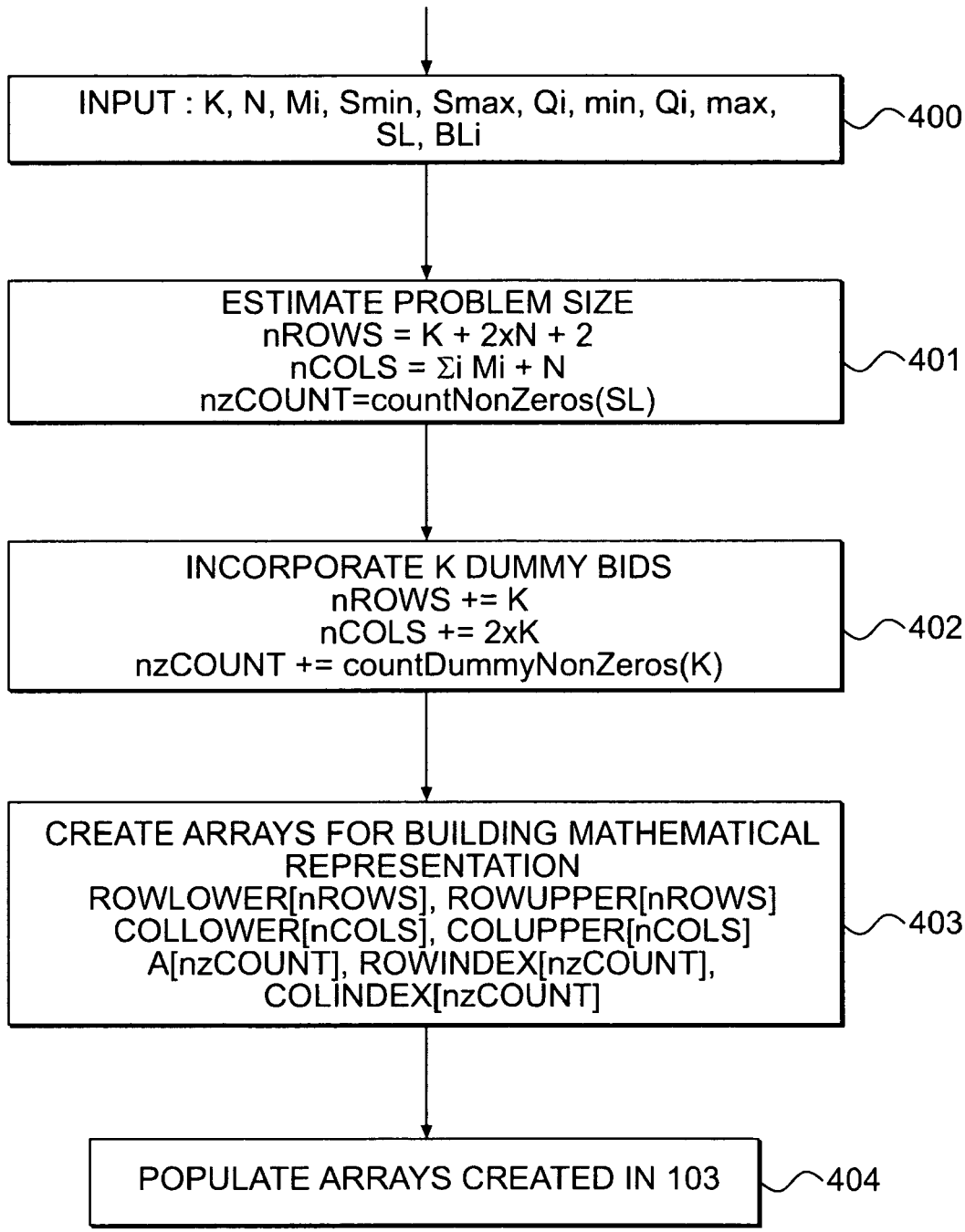
FIG. 4 identifies different modules (at a high level) for generating a computer-implemented algorithm for identifying an optimal cost-minimizing set in accordance with the present invention.

FIG. 4 sets forth steps included in the method of the present invention for automatically creating a computer-implemented algorithm for identifying the cost-minimizing bid set previously discussed. In step 400, the parameters of the auction are used as inputs. Based on these inputs, the size of a constraint matrix and a number of non-zero entries are determined, in step 401. The size of the constraint matrix is then refined to account for the dummy bids that are added to the formulation, in step 402. Once the size is determined, an appropriately sized array is created, in step 403, and then populated based on the formulation in step 404.

Figure 5:
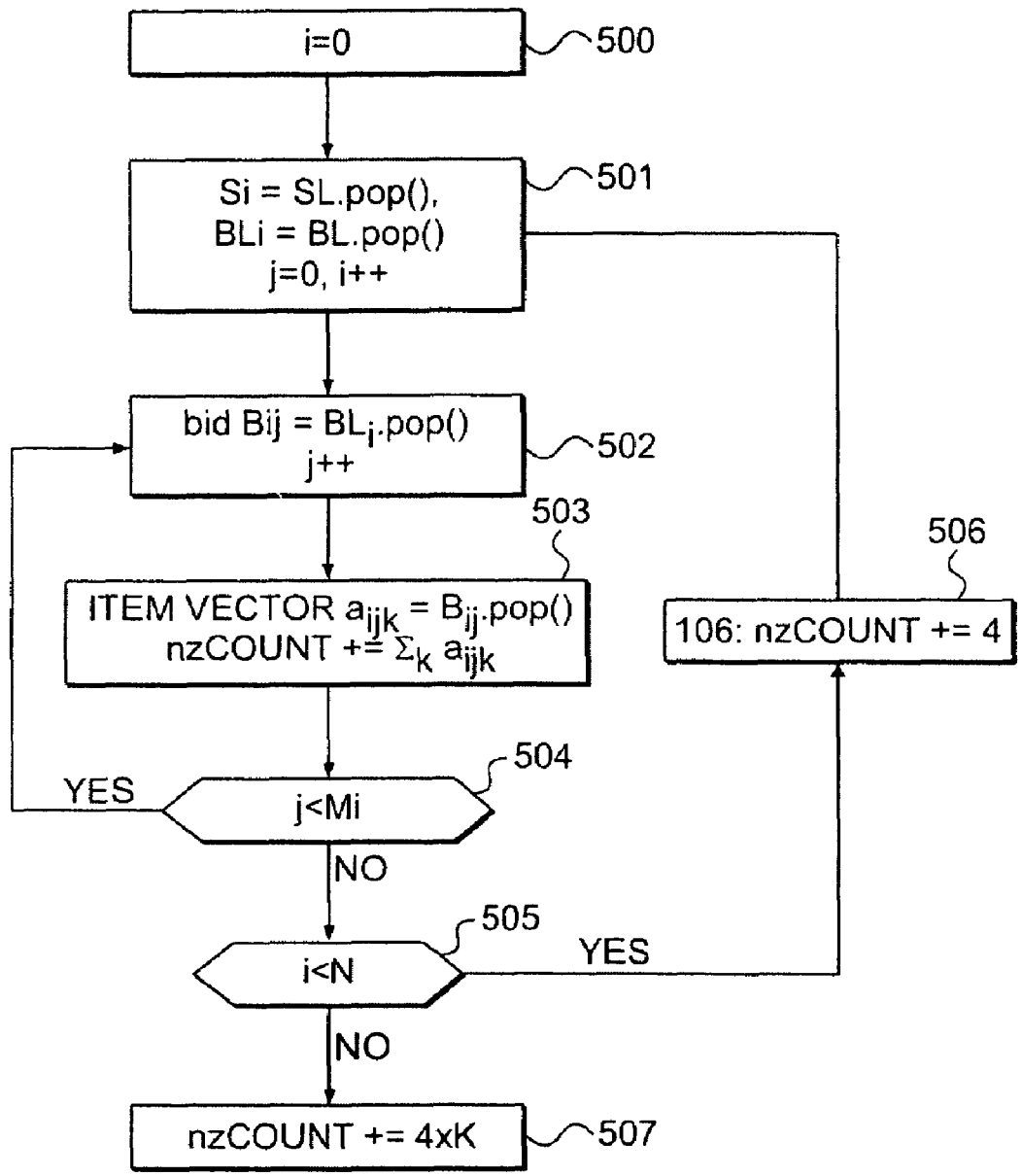
FIG. 5 is a flow diagram describing a procedure for computing a number of non-zeros for each of the arrays used in the representation of the present invention.

FIG. 5 is a flow diagram describing a procedure for counting non-zeros in the constraint matrix based on the formulation described above. According to this procedure, an index is used for the suppliers and the number of bids for each supplier. The supplier index i is initialized to zero, in step 500, and the first supplier and his/her associated bid list is then acquired from the supplier and bid list, in step 501. Each bid is popped from the bid list, at 502, and the item vector for the bid is acquired in 503. The number of items in the item vector is added to the count of non-zeros 503. This is done for all bids of the supplier, 504, and all suppliers, 505. For each supplier, the count is increased by 4, in step 506, to account for counting variables. Finally, the count is updated to add non-zeros for the dummy variables, in step 507.

Figure 6:
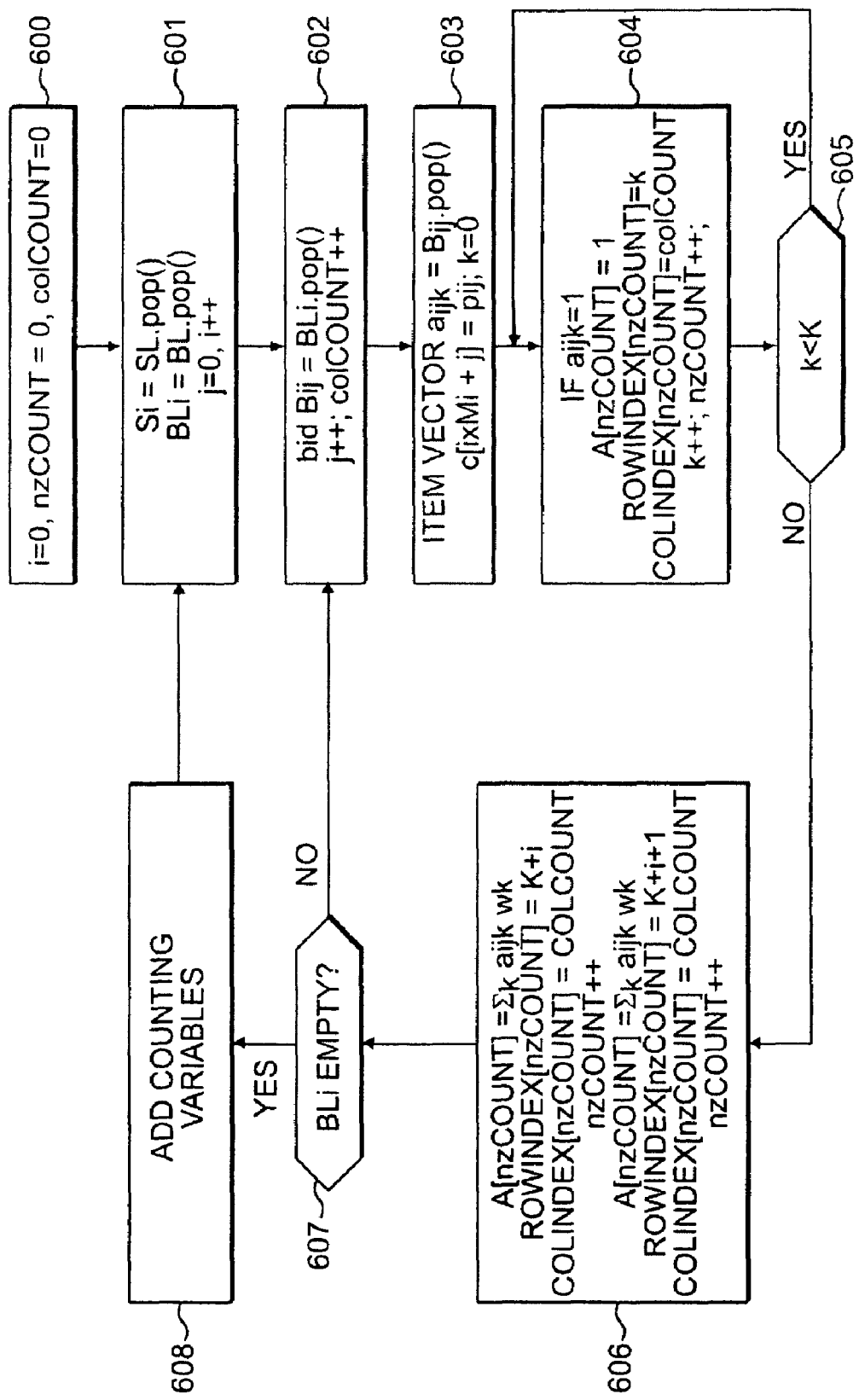
FIG. 6 provides a method for populating the arrays in accordance with the present invention.

FIG. 6 is a flow diagram describing a procedure for creating the constraint matrix associated with the formulation. The method starts, at step 600, with initializing the supplier index i, a non-zero count (nzCount), and a column count (colCount). The first supplier and his/her associated bid list is then acquired from the supplier and bid list, at step 601. Each bid is popped from the bid list, step 602, and the item vector for the bid is acquired, at step 603. The objective value for the corresponding decision variable is also updated at step 603. For each non-zero item in the vector, at 605, introduce a non-zero entry in the constraint matrix with the appropriate row and column index 604. At step 607, for each bid add 2 non-zero entries for min/max quantity constraint 606. Finally, add non-zero entries for the counting variables, at step 608.

Figure 7:
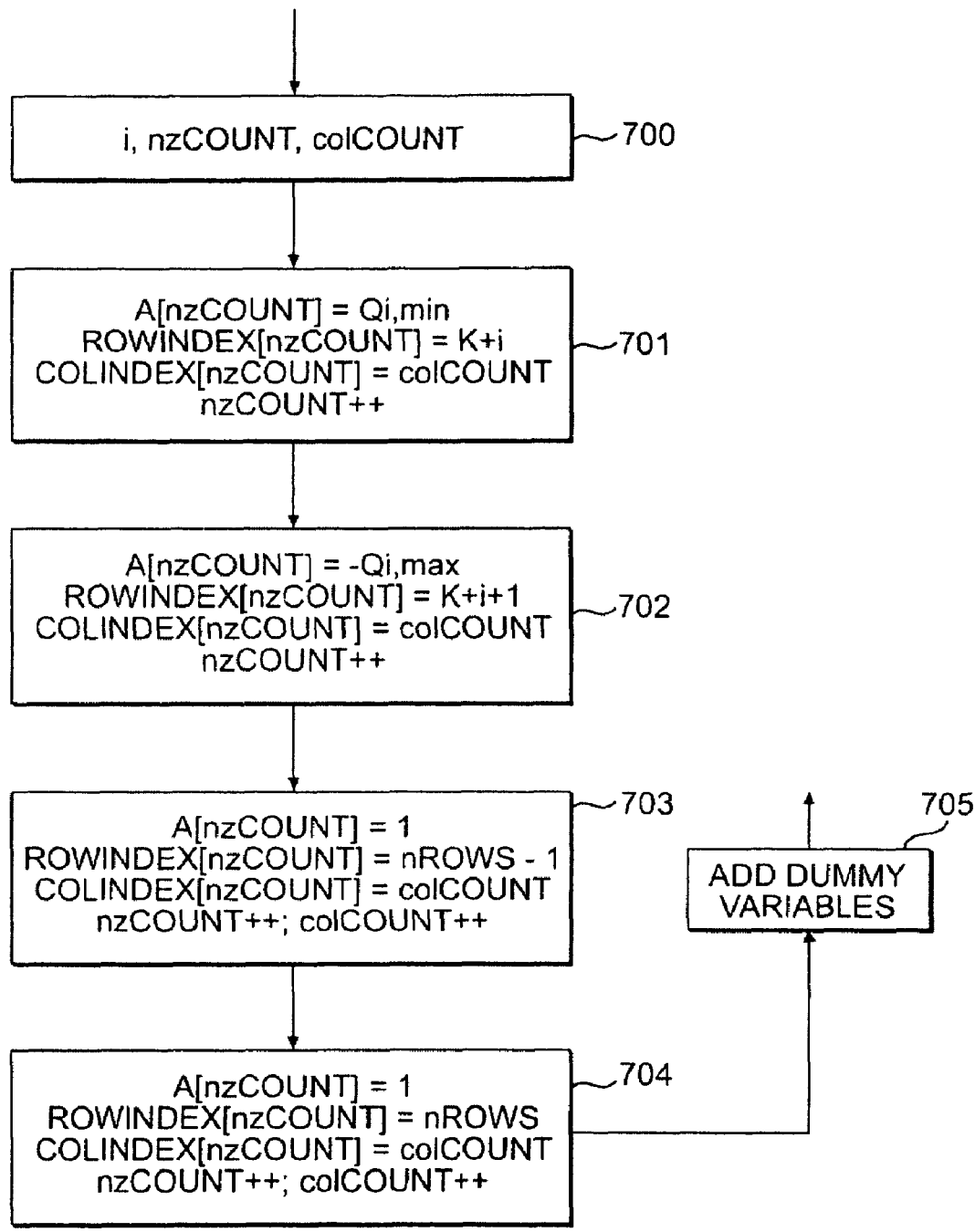
FIG. 7 extends the method in FIG. 6 by providing more detail about the manner in which counting variables are introduced in accordance with the present invention.

FIG. 7 describes a procedure for adding the non-zero entries for the counting variables. The procedure starts, at step 700, with initial values from FIG. 6 for the supplier index i, nzCount, colCount. Next, a non-zero entry is introduced for the minimum quantity constraint 701 and the maximum quantity constraint 702. Additionally, a non-zero entry is added for the minimum number of suppliers constraint, 703, and the maximum number of suppliers constraint 704. Finally, the non-zeros associated with the introduction of dummy variables 705 are added.

Figure 8:
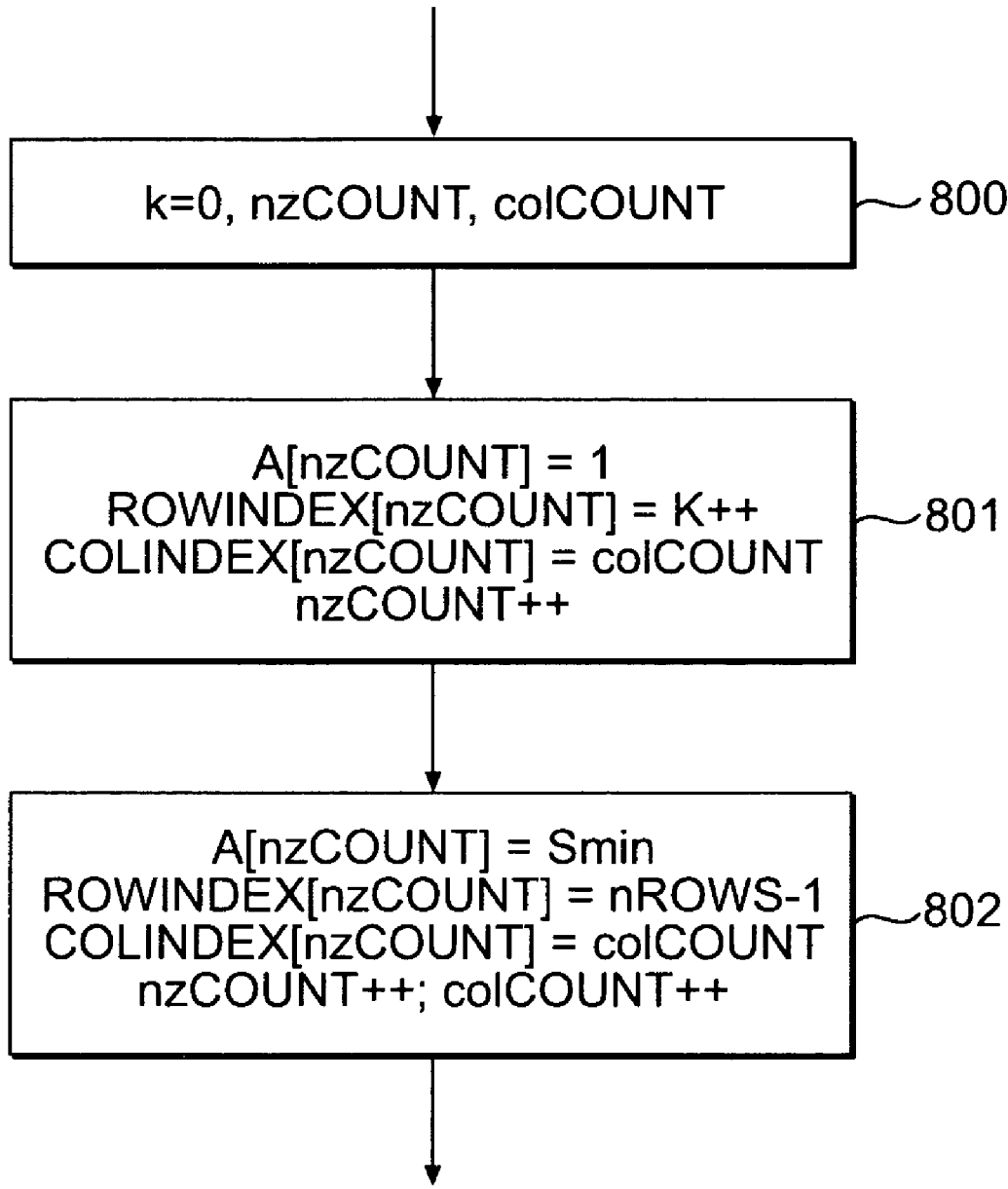
FIG. 8 is a flow diagram describing a procedure for introducing dummy variables in accordance with the present invention.

FIG. 8 describes a procedure for introducing non-zero entries for the dummy variables. The method starts, at 800, with initializing the index for dummy variable (k) and nzCount and colCount. The next step involves introducing the non-zeros involved with demand for each item, at 801, and finally a non-zero entry for the minimum number of suppliers, at 802.

Figure 9:
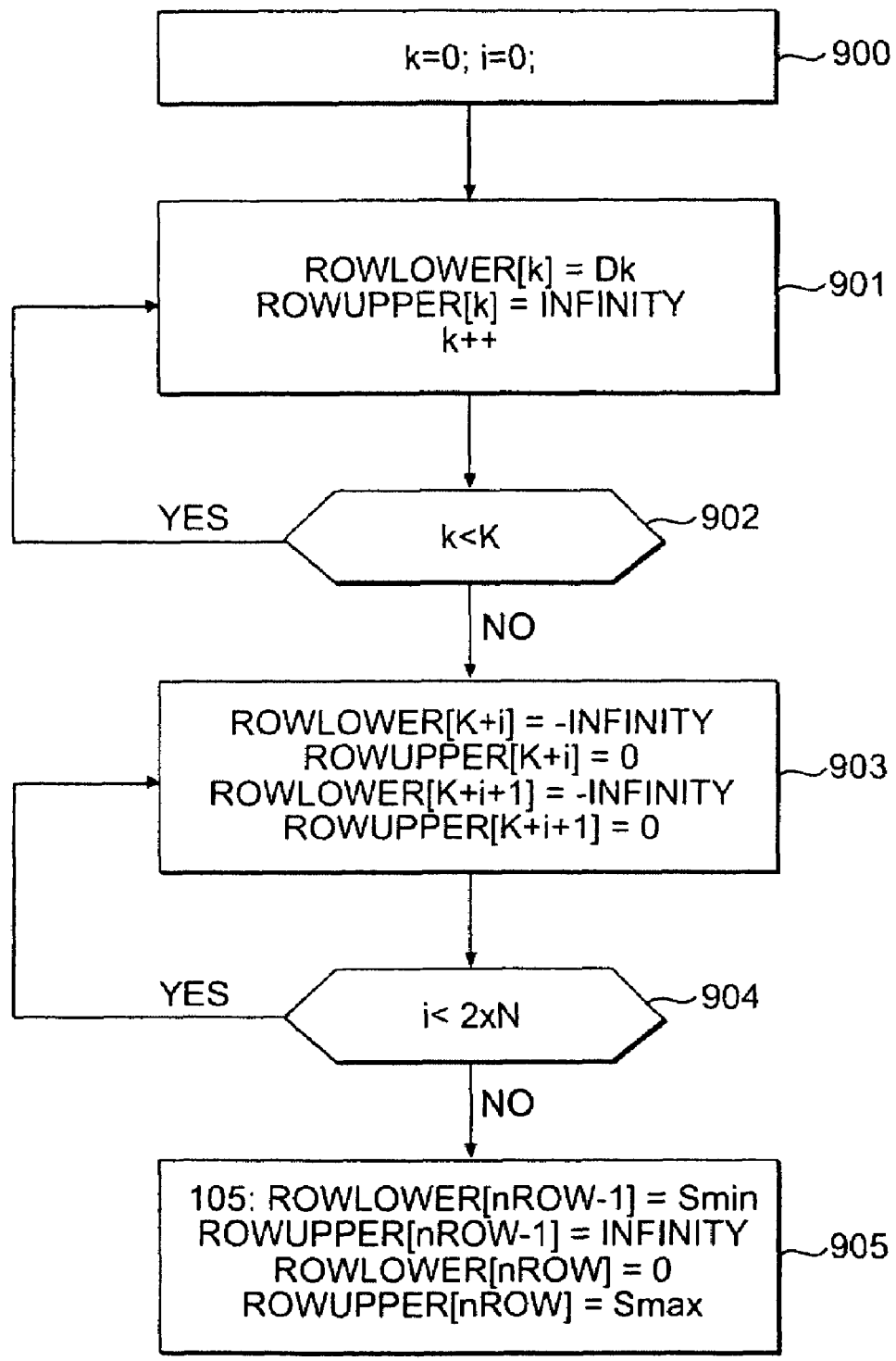
FIG. 9 is a flow diagram describing a procedure for populating arrays that provide upper and lower bounds for the rows of the constraint matrix in accordance with the present invention.

FIG. 9 describes a procedure for populating the arrays associated with the raw constraints. This procedure begins, at 900, by initializing the index for the items and the suppliers. For each item, 902, the lower and upper bounds for each demand constraint, 901, are introduced. Next, the lower bounds and upper bounds for the min/max quantity constraints, 903, are introduced for each supplier 904. Finally, the lower and upper bounds for the minimum and maximum number of supplier constraint 905 are introduced.

Figure 10:
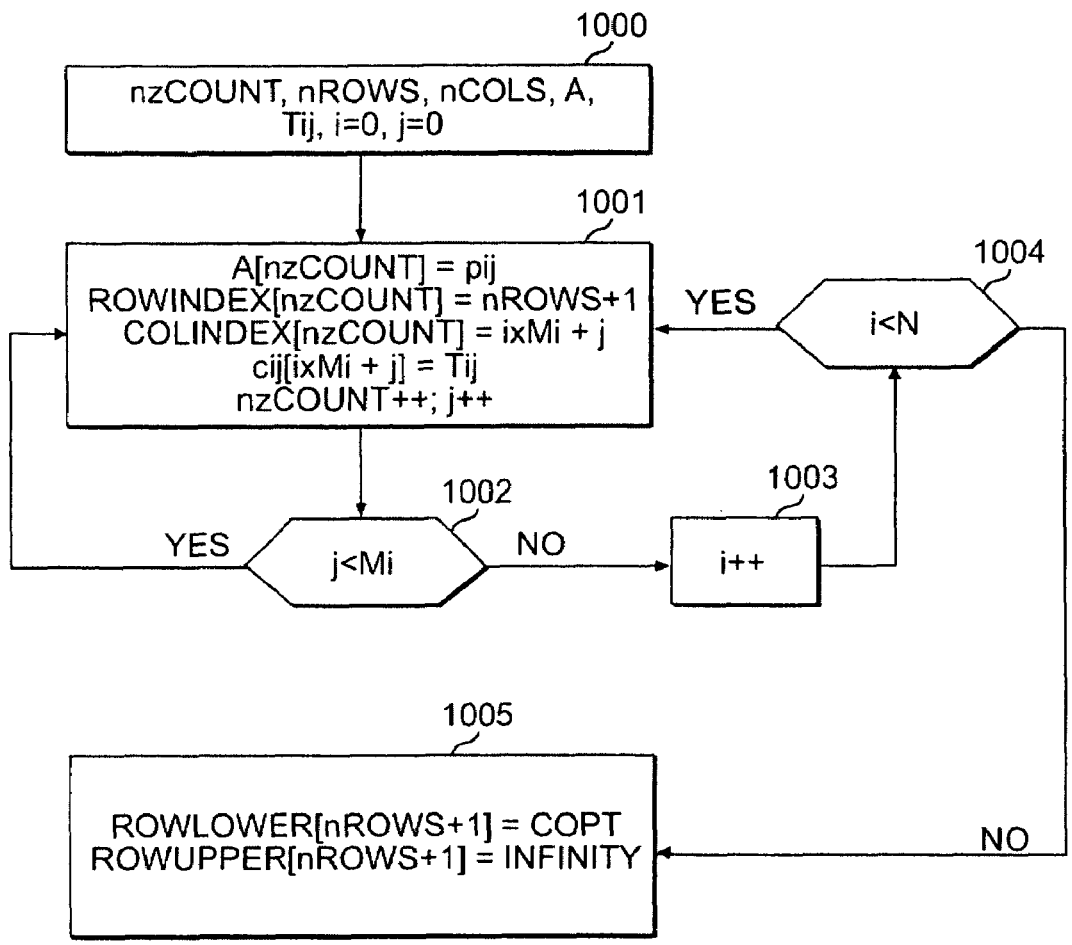
FIG. 10 is a flow diagram describing a procedure for extending the computer-implemented algorithm of the present invention to incorporate a fixed cost level as a constraint and use a secondary objective in terms of timestamps.

FIG. 10 describes a procedure for extending the computer-implemented representation to solve for the secondary objective of minimizing timestamps on the bid set for a given cost level. This procedure starts, at 1000, with initial values for the parameters from FIG. 9 and input values for the timestamps for each bid. Then, a new constraint row is introduced to capture the cost constraint. For each bid 1001, a non-zero entry is introduced corresponding to the bidprice, 1002, 1003, 1004. The corresponding objective is then changed to the timestamp of the bid 1001, and finally the upper and lower bounds for the constraint raw are provided 1005. The foregoing steps of the method of the present invention will be described in greater detail in the discussion which follows.

Problem Representation

As previously indicated, the present invention optimally solves the so-called winner determination problem by identifying the cost-minimizing bid set during a reverse combinatorial auction. The winner determination problem may be represented using:

1. The number of suppliers N, and the number of bids for each supplier $M_i$, where i=1, . . . , N.
2. A list of suppliers SL, where each supplier in the list is denoted by $SL_j$.
3. Associated with each supplier is a list of bids $BL_1$.
4. Each bid in the list $BL_j$ is denoted by $B_{ij}$, where j=1, . . . $M_i$.
5. Associated with each bid $B_{ij}$ is a list of items that are included in the bid and is denoted by a vector 0/1 $a_{ij}^k$ where k=1, . . . K, and where $a_{ij}^k$=1 if item k is included in bid $B_{ij}$.
6. Array A to represent the constraint matrix.
7. Array c to represent the costs.
8. collower, colupper to provide lower and upper bounds for the decision variables.
9. rowlower, rowupper to provide lower and upper bounds for each constraint row.
10. rowindex, colindex to provide indices for non-zero elements of A.
11. Demand $D_k$ associated with each item.

Mathematical Formulation of Algorithm

In formulating the algorithm of the present invention, it is assumed that the procurer wishes to buy a set of k items, where:

For each item k∈K, there is a demand for $d^k$ units of the item (called a lot).
Each supplier i∈N is allowed up to M bids indexed by j.
Each bid $B_{ij}$ is associated with a zero-one vector $a_{ij}^k$, where k=1, . . . , K and $a_{ij}^k$=1 if $B_{ij}$ will supply the (entire) lot corresponding to item k and zero otherwise.
Each bid $B_{ij}$ offers a price $p_{ij}$ at which the bidder is willing to supply the combination of items in the bid.

With these assumptions in place, a mixed-integer programming formulation for the reverse combinatorial auction is written as follows:

$$\text{minimize} \sum_{i \in N} \sum_{j \in M} p_{ij} x_{ij}$$

subject to $$\sum_{i \in N} \sum_{j \in M} d_{ij}^k x_{ij} \geq 1 \forall k \in K \quad (a)$$

$$x_{ij} \in \{0, 1\} \forall i \in N, \forall j \in M \quad (1)$$

The decision variable $x_{ij}$ takes the value 1 if the bid $B_{ij}$ is a winning bid in the auction, and 0 otherwise. Constraint (a), above, states that the total number of units of each item in all the winning bids must satisfy the demand the buyer has for the item. In this auction, goods complement each other. Therefore, the valuations of sets of items are sub-additive, i.e., the price offered by a particular supplier for two non-disjoint sets of items A and B, p(A) and p(B), is such that p(A)+p(B)≧p(A+B). Such sub-additive cost functions result from complementary costs, such as the use of a common warehouse or unused capacity in a carrier.

Side Constraints

The auction mechanism and side constraints of the present invention may be similar to those of a volume-discount auction. These side constraints include:
1. minimum and maximum number of winning suppliers;
2. minimum and maximum total quantity allocated to each supplier;
3. reservation prices on each lot.

These constraints can be added to the MIP formulation as follows:

$$W_{i,min} y_i \leq \sum_{k \in K} \sum_{j \in M} a_{ij}^k d^k x_{ij} \forall\ i \in N \quad (a)$$

$$\sum_{k \in K} \sum_{j \in M} a_{ij}^k d^k x_{ij} \leq W_{i,max} y_i \forall\ i \in N \quad (b)$$

$$\sum_{j \in M} x_{ij} \geq y_i \forall\ i \in N \quad (c)$$

$$S_{min} \leq \sum_{i \in N} y_i \leq S_{max} \quad (d)$$

$$y_i \in \{0, 1\} \quad \forall\ i \in N$$

(2)

In the above equations, $W_{i,min}$ and $W_{i,max}$ relate to the minimum and maximum quantity that can be allocated to any supplier i. Constraints (a) and (b) restrict the total allocation to any supplier to lie within ($W_{i,min}$ and $W_{i,max}$). Note that $y_i$ is an indicator variable that takes the value 1 if supplier i is allocated any lot. Notice that if $W_{i,min}$=0 then $y_i$ becomes a free variable. In order to fix this problem, we introduce constraint (c) which ensures that $y_i$=0 if no bids from supplier i are chosen. $S_{min}$ and $S_{max}$ relate to the minimum and maximum number of winners required for the allocation. Constraint (d) restricts the total number of winners to be within the range ($S_{min}$ and $S_{max}$).

In a typical auction, there are 6-10 suppliers and 250 lots for auction. The maximum problem size may be expected to be 30 suppliers and 400 lots. There is no limit on the number of lots in each bid, although this could be limited if required to improve solution time. Solutions for the winner determination problem are needed on the order of 5-10 minutes.

Auction Mechanism and Computations

Figure 11A:
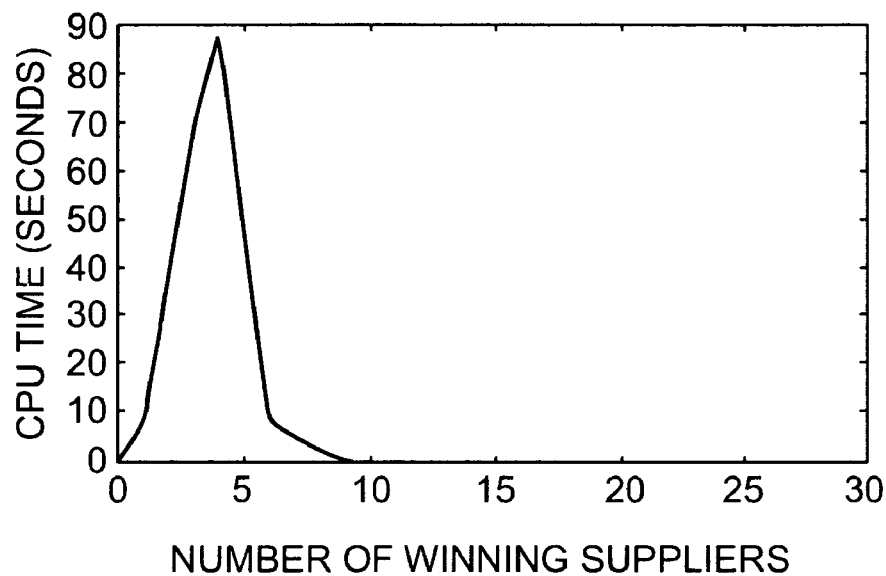
FIG. 11(a) illustrates how varying the number of permitted winning suppliers affects problem solving time.
Figure 11B:
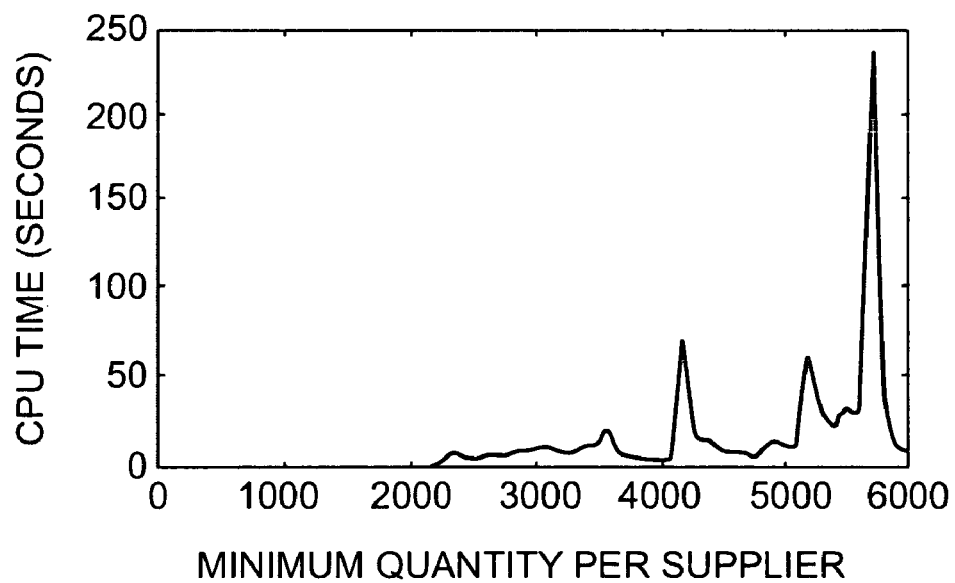
FIG. 11(b) shows what happens when the minimum quantity assigned to each supplier constant is varied.

The Inventors of the present application conducted experiments to investigate the difficulty of solving the winner determination problem with respect to the side constraints in the auction. FIGS. 11(a) and 11(b) present results for one example of a single-round reverse combinatorial auction winner determination problem.

This particular instance was generated randomly. For each supplier, a set of lots the supplier was interested in was generated, and a set of bids for different subsets of this set were also generated. A single bundled bid for a set of lots S would be for a lower price than that of the sum of the prices of any set of bids by the same supplier, which also, in total, covers all the lots in S. This particular problem had 30 suppliers and 15 lots available for auction.

Each supplier made multiple bids: in total there were 352 bids. With no side constraints, there were 12 winning bids and 12 winning suppliers. FIG. 11(a) illustrates how varying the number of permitted winning suppliers affects problem solving time. Once again, we set the minimum number of winning suppliers to be equal to the maximum number of winning suppliers, which was varied between 1 and 30. Decreasing the number of permitted winning suppliers below 14 increased problem solving time significantly, reaching a peak at 4 winning suppliers. The total demand of the auction could not be satisfied with less than 5 suppliers. Increasing the number of permitted suppliers did not make the problem harder to solve.

FIG. 11(b) shows what happens when we vary the minimum quantity assigned to each supplier constraint. For these experiments, each supplier had the same minimum total quantity constraint. With no side constraints, the solution to the winner determination problem assigns a maximum quantity of 1800 to any supplier. We see here that as this minimum quantity is increased, the problem becomes increasingly harder to solve. Conversely, we found that problem difficulty was not substantially affected by varying the maximum quantity allocated to each supplier constraint.

As previously discussed, finding feasible solutions for some instances of this problem is difficult. This also has a big impact on the run time. In accordance with the present invention, this situation may be dealt with by introducing a dummy bid for each lot with a price set to K times the largest bid price in the auction. More specifically, dummy bids are added to the integer programming formulation for the demand cover constraints, but do not appear in the side constraints for min/max quantity or min/max number of winning suppliers. A dummy bid for a particular lot type will only appear in an optimal solution to the winner determination problem for these auctions if there is no way to satisfy the demand for tile lot. using an existing real bid. Thus, any solution to the winner determination problem will still satisfy the entire demand for lots in the auction. Should there be dummy bids in the set of winning bids for the winner determination problem, these are removed from the set before the real winning bids are returned to the buyer and infeasibility is indicated.

Operational Issues

At least two operational issues emerge in the application taken by the present invention. Both issues arise as requirements in a practical setting and have interesting implications in terms of refining the formulations provided above.

Feasibility. In a multi-round auction mechanism, there may not be enough bids placed in earlier rounds in the auction to satisfy the total demand requested by the procurer. In such cases, the formulations presented earlier for the volume-discount and combinatorial auction winner determination problem (formulation (1)) will be infeasible. In practice, it has been determined that the procurer preferred to receive a partial allocation if the entire demand could not be met. (Here, the customer specified that the side constraints be satisfied at all times, and only the demand constraints could be relaxed.) This requirement may be modeled using the existing formulations by adding dummy bids to the formulation as described earlier.

Timestamps. One issue which arises in the context of multi-round auctions is the treatment of bids made in different rounds of the auction, for the same bundle of items at the same price or supply curve. Consider the following example: A combinatorial procurement auction is created to purchase some quantities of items {1, 2, 3}. In the first round of the auction, Supplier 1 makes a bid $B_1$ for items $\{1, 2, 3\}$ at a price of $100, and Supplier 2 bids $B_2$ of $30 for item $\{1\}$.

In accordance with the invention, the solution to the winner determination problem for this round is that Supplier 1 wins with bid $B_1$. During the second round, a new supplier, Supplier 3, enters the auction with a bid $B_3$ for items $\{2,3\}$ at $70. Using the integer programming formulation discussed earlier (Equation 1), there are two potential solutions to this combinatorial auction winner determination problem: Either $\{B_1\}$ or $\{B_2,B_3\}$. In both cases the total cost to the procurer is $100.

From a business point of view, these two solutions are not both equally desirable. In a multi-round procurement auction, new bids should only supercede existing winning bids if they result in a lower price being paid for the items in the auction. One way to handle such situations is to have a rule stating that, given two identical bids, the bid that was made earlier in time is to be preferred. This rule is straightforward to enforce in a simple, single or multi-item forward or reverse auction. In the context of combinatorial and volume-discount auctions, this rule becomes harder to enforce because the number of possible solutions to the winner determination problem may be exponential in the number of bids placed in the auction.

In practice, each bid $B_1$ is associated with a timestamp $TS_i$ representing the time the bid was accepted into the auction. (For illustrative purposes, the timestamp may be assumed to be an integer. In the customer implementation of these auctions, the timestamp was of the SQL type "timestamp.") The new objective for the winner determination problem then becomes to select the set from the set of all sets of bids which minimizes the total cost, such that this set minimizes the sum of the timestamps of a the winning bids. (For efficiency and scalability purposes, the bids may be sorted by their timestamps into a list. The order that the bids appear may then be used, rather than their timestamps.)

Thus, the invention contemplates a further timestamp objective which is secondary to the cost objective and which may be expressed as follows:

$$\text{minimize} \sum_{i \in N} TS_i x_{ij} \quad (3)$$

We have considered and implemented two ways of dealing with this issue. We describe these techniques below.

Multiple formulations. The first way to deal with the timestamp issue works by solving two integer programming problems. The first problem we solve is the winner determination problem (for either the combinatorial or volume-discount auction) without considering timestamps at all, i.e., by using the formulation in equation (1). We then formulate a new integer programming problem, which differs from the first formulation in two ways:

1. We take the value of the objective v in the solution to the first integer programming problem, which represents the minimum cost price to the procurer to purchase their demand in the auction. We add as a constraint that the demand should be bought at this price. For the combinatorial auction formulation (1), this constraint is written as:

$$\sum_{i \in N} p_i x_{ij} = v \quad (4)$$

For the volume discount auction formulation, this constraint is:

$$\sum_{i \in N} \sum_{j \in M_i^k} z_{ij}^k P_{ij}^k = v \quad (5)$$

The formulation (4) provided for the reverse combinatorial procurement auction is a set covering problem, which is NP-hard. Since this remains the core even after adding the side constraints, the overall formulation with side constraints remains NP-hard. There is a greedy approach for set covering which yields an $O(\log_2 n)$ approximation, and it has been shown that this cannot be significantly improved.

The addition of the side constraints makes a fundamental impact on the feasibility of the problem. Without these, we could always choose all bids and get a feasible (albeit) expensive solution. However, with limits on the quantity allocated to each supplier and on the total number of winners, a feasible solution might not exist or if one exists it might be difficult to find.

2. The new objective becomes to minimize the sum of the timestamps of winning bids (Equation 3). The steps for solving for the new objective are the same as before except that the objective is specified as equation 3.

Price Modification

The second technique encodes information concerning the time a bid was made into the price of the bid that is seen by the winner determination solver. Typically, prices are expressed to a fixed number of decimal places, usually two. Thus within the representation of the bid price as a floating point number, we can use digits beyond two decimal places to encode timestamp information. For instance, in our previous combinatorial auction example we had three bids: $B_1$ of $100 for items $\{1, 2, 3\}$, $B_2$ of $30 for items $\{1\}$, and $B_3$ of $70 for items $\{2,3\}$. If these bids $B_1$, $B_2$ and $B_3$ were made at times 1, 2 and 4 respectively, we might encode the timestamps into the bid prices such at $p_1=\$100.001$, $P_2=\$30.002$, and $p_3=\$70.004$. We then solve the integer programming problem with the same objective to minimize the total cost to the procurer. The set of winning bids that minimizes the total cost will also be the one whose bids were made the earliest. In this example, bid $B_1$ has a lower cost (100.001) than bids $B_2$ and $B_3$ combined (100.006), so $B_1$ will be the winning bid.

Some care must be taken when encoding timestamp information into bid prices. First, using the scheme outlined above, the following situation may occur. Suppose that bid $B_3$ was accepted at time 2, $B_2$ was accepted at time 4, and bid $B_1$ was accepted at time 5. The corresponding prices on these bids with timestamps become $p_3=\$70.002$, $p_2=\$30.004$, and $p_1=\$100.005$. Bid $B_1$ would be the winning bid in this example, even though bids $B_2$ and $B_3$ were made earlier and for the same total (real) cost. The problem here is that the sum of the timestamp portions of the bid prices for bids $B_2$ and $B_3$ is greater than that for bid $B_1$, even though their individual timestamp parts of the bid price are less.

To resolve this problem, we must take into account the number of items within each bid when determining timestamp bid price modifications. To do this, we sort all the bids by their timestamps into a list We set a counter variable ts=0. We then take each bid $B_i$ from the list, in order, increment the variable ts by the number of items in bid Bi, and set the timestamp portion of the bid $B_i$ to the current value of the variable ts. For our running example, the bid prices become $p_3=\$70.002$, $p_2=\$30.003$, and $p_1=\$100.006$.

The advantage of this price modification technique for dealing with timestamps is that we only have to solve one integer programming problem in order to determine the winners of the auction. The main disadvantage is the precision of the floating point arithmetic limits how many bids we can deal with in this way, while guaranteeing that the time-stamp part of the modified bid price does not interfere with the real part of the modified bid price. (In practice, given n bids each for m items, we need ceil $$\left(\log_2\left(\frac{nm \times (nm+1)}{2}\right)\right)$$

exclusive digits within the bid price in which to store the timestamp information, in order to guarantee that the timestamp part of the bid price does not interfere with the real (price) part of the bid price.)

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

We claim:

1. A computer implemented method for identifying a cost-minimizing bid set for a reverse combinatorial auction where all-of-nothing-bids are allowed, the computer performing the steps of:

receiving in a computer a plurality of bids, each bid having a timestamp, a bid price and item information identifying at least one bid item;

introducing in the computer a decision variable for each bid;

introducing in the computer a counting variable to indicate whether bids from a supplier are chosen in an optimal bid set;

modeling demand constraints by the computer for each item using decision variable for each bid;

modeling minimum and maximum numbers of suppliers by the computer based on the counting variables;

introducing in the computer dummy bids, based on said modeled demand constraints, to ensure computability of a cost-minimizing bid set meeting said modeled demand constraints;

providing the computer with an objective of choosing bids that arrive early, for a given cost, based on an additional timestamped objective with the given cost level as a constraint;

introducing price modifications in the computer to at least one of said bid's respective item information and adjusting, based on said price modifications, the provided objective of choosing bids that arrive early, and generating a winner of the reverse combinatorial auction by the computer, by selecting the cost-minimizing bid set from among said plurality of bids, the selecting based on said time stamps, said bid prices, said item information, said provided objective of choosing bids that arrive early, and said modeled demand constraints.

2. The computer implemented method of claim 1, wherein the reverse combinatorial auction is a single-round auction.

3. The computer implemented method of claim 1, wherein the reverse combinatorial auction is a multiple-round auction.

* * * * *